United States Patent [19]

Noguchi

[11] Patent Number: 5,456,776
[45] Date of Patent: Oct. 10, 1995

[54] SEALED ORNAMENT OF DRIED AND PRESSED FLOWER AND METHOD FOR MANUFACTURING THE SAME

[75] Inventor: Makoto Noguchi, Kyoto, Japan

[73] Assignee: Mieko Sakai, Tokyo, Japan

[21] Appl. No.: 231,382

[22] Filed: Apr. 22, 1994

Related U.S. Application Data

[62] Division of Ser. No. 761,743, Jun. 11, 1992.

[30] Foreign Application Priority Data

Jun. 7, 1990 [JP] Japan ..................... 2-149130

[51] Int. Cl.$^6$ ..................... A01N 3/00
[52] U.S. Cl. ................ 156/57; 427/4; 428/13; 428/24
[58] Field of Search ............ 156/57; 427/4; 428/7, 13, 24

[56] References Cited

U.S. PATENT DOCUMENTS

| | | | |
|---|---|---|---|
| 3,718,529 | 2/1973 | Coleman et al. | 428/17 |
| 3,886,248 | 5/1975 | Nicholson | 428/13 X |
| 4,885,037 | 12/1989 | Ohkubo | 427/4 X |

FOREIGN PATENT DOCUMENTS

| | | | |
|---|---|---|---|
| 0342248A1 | 11/1989 | European Pat. Off. | |
| 60-19600 | 1/1985 | Japan | 428/24 |
| 62-231091 | 10/1987 | Japan | 428/24 |

*Primary Examiner*—Henry F. Epstein
*Attorney, Agent, or Firm*—Austin R. Miller

[57] ABSTRACT

The present invention includes a sealed ornament of a dried and pressed flower completely sealed by a film having a low melting point in a substantially absolutely dried state and in a state free from air and moisture in order that the dried and pressed flower maintains its gracefulness without discoloring and fading for long periods and method of producing the same. The sealed ornament may be further secured to a base in a substantially absolutely dried state and in a state free from air and moisture, a cover film secured externally of the film having a low melting point as necessary, and the outermost layer coated with a coating resin as necessary. The method for manufacturing a sealed ornament of a dried and pressed flower includes sealing the dried and pressed flower by a film having a low melting point by pressing the film having a low melting point onto the dried and pressed flower in a state exposed to a reduced-pressure atmosphere and in a state of reduced-pressure atmosphere to melt the film having a low melting point, and placing the film having a low melting point on a base and or a cover film as necessary to effect pressing and heating processing.

19 Claims, 2 Drawing Sheets

SEALED ORNAMENT OF DRIED AND PRESSED FLOWER AND METHOD FOR MANUFACTURING THE SAME

This application is a divisional of application Ser. No. 07/761,743, filed Jun. 11, 1992, pending.

TECHNICAL FIELD

This invention relates to an ornament of a dried and pressed flower decorated such that a dried and pressed flower is pasted to paper, cloth, film, leather, etc. or adhered to glass, metal, wood, pottery, etc. More specifically, this invention relates to such an ornament in which a dried and pressed flower is sealed to safely protect the form of a dried and pressed flower, and the color and gloss of the pressed flower can be maintained for a long period.

BACKGROUND

Conventionally, it has been carried out that a picked flower was dried to maintain the beauty thereof and used as an ornament.

For example, a flower is dried to make a dried and pressed flower, which is pasted to paper for use with a greeting card or which is pasted to cloth to provide the cloth with a pattern of the flower, etc.

In this case, a traditional method for obtaining a dried and pressed flower comprises sandwiching a picked flower between sheets of paper, pressing it for suitable number of days, and thereafter removing the flower.

Recent, in order to maintain color of a prepared flower, a process has been carried out which comprises putting a drying agent, for example, such as silica gel onto a bottom of a small box, placing a perforated plate thereon, placing paper, a picked flower, paper and an air-permeable urethane sheet on the plate and alternately placing paper, a flower and paper thereon so that three to four flowers are placed, closing the small box, and leaving them for about 2 to 7 days while removing air out of the small box. A flower removed from the small box by the above-described method has color and gloss close to a natural flower, which maintains the beauty for a relatively long period of time.

In this case, if a natural flower is treated with citric acid before putting it into a small box, it advantageously prevents colors of red and pink from becoming blackish.

As methods for utilization of a pressed flower, many methods are used. For example, a utilization method is known from Japanese Patent Publication No. 63-239091 which comprises directly laying out a dried and pressed flower on paper, preparing a cover material with a film and a sheet integrated, putting the cover over the pressed flower, and heating and pressing the whole body to provide a postcard. In this utilization method, a surface of the dried and pressed flower is covered with a film so that mechanical contact from the surface can be prevented, and water is not directly moved into cut flowers from the surface.

However, since the back side merely has paper, air as well as vapor can freely pass therethrough with only a slight restriction. Accordingly, the dried and pressed flower is in the same state as with no protective means. Contact with vapor or water is not preferable for a dried and pressed flower having moisture in the range of 10 to 20%. With the passage of time, suction of water and oxidization progress and fading progresses. Then, color and gloss of a natural flower are completely lost within several weeks.

For overcoming the aforesaid disadvantages noted with respect to the aforementioned utilization method, a method is known from Japanese Patent Laid-Open No. 62-231091 which comprises sandwiching a dried and pressed flower between two films having a low melting point and melting these two films to seal the dried and pressed flower from top and bottom. A further utilization method is known from Japanese Patent Laid-Open No. 63-112784 which comprises placing on a film having a low melting point a film having a higher melting point than the former, and fixing the whole to cloth.

These two examples have been devised to attach a flower to cloth. Japanese Patent Laid-Open No. 62-231091 proposes a method comprising sandwiching a dried and pressed flower between films having a melting point which is molten at approximately 95° C., pressing and heating the same to integrate the dried and pressed flower with the low melting point film, then placing it on cloth, and again pressing and heating it to place the flower on cloth.

Japanese Patent Laid-Open No. 63-112784 provides a method comprising placing a dried and pressed flower on a film having a low melting point at about 95° C. a film which is molten at about 110° C., first integrating the low melting point film with the high melting point film, then placing it on cloth, and pressing and heating the same to melt the high melting point film to integrate it with the cloth. According to this publication, an iron is used as a pressing and heating means, and when a flower is placed on a handkerchief or silk cloth, it does not slip out during washing.

In these two well-known examples, since the back side also has a film, as compared with the well-known example previously mentioned, it seems that the flower can be sufficiently protected from mechanical damage from the exterior and from the entry of air and vapor.

However, even if entry of air and water from the exterior is not present, a dried and pressed flower in this well-known example becomes degraded. That is, water, vapor and air are present between the low melting point films, or between petals, and between hairs on the surface of a small stalk. Even if a flower is sandwiched between two upper and lower films having a low melting point, which are pressed and heated to provide an integral configuration, air, water and vapors become in their greater part sealed as they are. Air and vapors are sometimes present in the form of foams within the film whose upper and lower portions are integral, which is unsightly. With the passage of time, the sealed air, water or vapor gradually act on a flower to change the color and gloss thereof. The time required for such change is longer than that of the first well-known example in which the back side comprises paper but is not sufficient.

The present invention overcomes the drawbacks noted above with respect to prior art and provides a sealed ornament of a dried and pressed flower which can maintain color and gloss of a dried and pressed flower for longer periods of time and can be used without modification.

DISCLOSURE OF THE INVENTION

According to the present invention, a dried and pressed flower is completely sealed by a film having a low melting point in a substantially absolutely dried state and in a state free from air and moisture. With this, it is possible to obtain a sealed ornament of a dried and pressed flower in which the flower is not discolored or faded for a long period of time.

Furthermore, a dried and pressed flower is completely sealed by a film having a low melting point in a substantially dried state and in a state free from air and moisture and is secured to a base. With this, it is possible to obtain a sealed ornament of a dried and pressed flower which can maintain a gracefulness of a dried and pressed flower for a long period of time and which renders possible a variety of uses as an ornament.

Moreover, a cover film is secured externally of a film having a low melting point by means of a film having a low melting point. With this, protection of the aforementioned two ornaments of a dried and pressed flower is further strengthened.

In of the aforementioned three cases, an outer-most layer is applied with a resin film. With this, a sealed ornament of a dried and pressed flower whose product is glossy and more graceful is obtained.

In the aforementioned four cases, a film having a low melting point and or a cover film is applied with treatments by an antioxidant and/or an ultraviolet absorbent. With this, a sealed ornament of a dried and pressed flower in which a film and a dried and pressed flower is prevented from being degraded due to light from outside and which can withstand the use for a long period of time.

During manufacture, when a dried and pressed flower is sealed by a film having a low melting point, the film is pressed against the flower in the state exposed to a (pressure) reduction atmosphere and in the state of pressure reduction atmosphere to melt the film. With this, it is possible to manufacture a sealed ornament of a dried and pressed flower in which a dried and pressed flower is not faded and discolored for a long period of time and is completely sealed by a film having a low melting point in a substantially absolutely dried state and in a state free from air and moisture.

Furthermore, during manufacture, a film having a low melting point is placed on a base and/or a cover film, which is to a subjected pressing and heating treatment. With this, it is possible to manufacture a sealed ornament of a dried and pressed flower which is not faded and disclored for a long period of time.

Moreover, in the above-described or the previously described manufacture, a dried and pressed flower is placed on a base whose surface is dense, on which is placed a film having a low melting point and a cover film is further placed thereon for treatment. With this, it is possible to obtain a method for manufacturing a sealed ornament of a dried and pressed flower in which the whole is fabricated at once on a base whose surface is dense as in a porcelain plate.

BEST MODE FOR CARRYING OUT THE INVENTION

Figure 1:
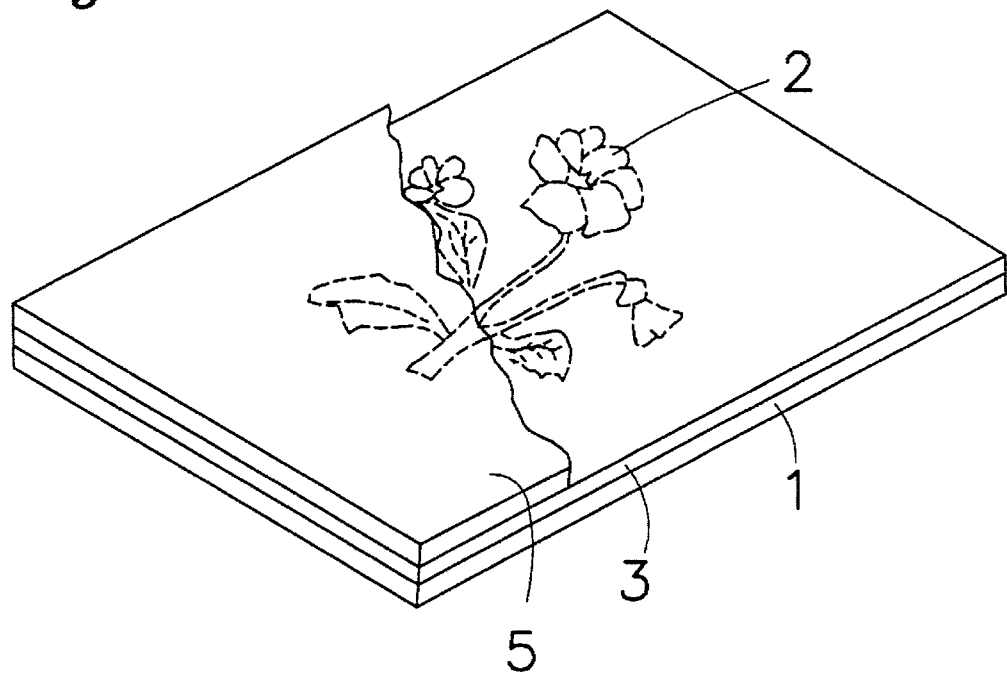
FIG. 1 is an inclined view partly cutaway of an sealed ornament of a dried and pressed flower according to the present invention.

In the present invention, a film having a low melting point is used. At least one film having a low melting point is necessary, and two or more of them may be used. A film having a low melting point is not particularly limited to polypropylene, polybutyral, ethylenevinylacetate, polyamide, etc. if it is molten at a temperature in the range from approximately 70° C. to 120° C. The thickness of a film having a low melting point is also suitably selected according to kind and shape of flowers. In a case where only one film is used, 100μ or more is preferable but 20 to 30μ may be used according to the conditions of use. In a case where two films are used, these need not to have the same thickness. The thickness of one or two films will suffice to be about 30μ. The area of a film will suffice to be an area enough to wrap a flower when the film is molten, and an area larger than the former can be also used.

A film having a low melting point is sometimes used singly. Further, a film having a low melting point is integrally placed over a cover film in advance for use or they are placed one over the other in a separate state for use.

A cover film should have a melting point at which the shape of the film is secured at the melting temperature of the film having a low melting point. A polyester film is the most preferable material for a cover film due to the fact that a transparent film is easily obtained and that mechanical strength and stability of dimension are excellent. Other materials can be used if they have the aforementioned temperature conditions and mechanical characteristics.

In the present invention, the outermost layer is sometimes applied With a resin coating. Generally, the resin coating is carried out by methods such as coating and spraying. However, a film-like material is placed on the layer, which is then molten to wrap the whole.

A base used in the present invention may include those which are generally hard and whose surface is dense such as wood, glass, metal, pottery, synthetic resin plate, etc.; those which are soft and whose surface is rough such as fiber cloth, paper, etc.; those which are soft and whose surface is dense such as films; and those which are soft and whose surface is rough or dense such as leather.

The term "under reduced pressure" used in the present invention means the state in which a sealed chamber is formed, after which,air in the chamber is discharged by use of a commercially available vacuum pump, and a meter provided on the vacuum pump displays less than 200 mm, most preferably, 0, in a case of indicating 760 mm of mercury column height prior to operation.

Furthermore, a dried and pressed flower used in the present invention is one which is picked, after which it is manufactured by a suitable method. For example, methods for manufacture include a method comprising sandwiching a flower between sheets of paper to press it, replacing the paper once or twice a day and continuing pressing; a method comprising putting a flower into a small chamber in a pressed state, putting a drying agent into the small chamber, and removing it after passage of several days while discharging air from the small chamber, etc.

The term "pressing" used in the present invention means a pressure applied when a dried and pressed flower and a film having a low melting point are placed in contact under pressure to melt a film having a low melting point, the pressure being approximately 1.5 arm. This pressure is applied to prevent the molten film having a low melting point from being contracted.

A first embodiment according to the present invention is concerned with a product obtained by placing a dried and pressed flower on a bed plate, placing a film having a low melting point thereon, placing an atmosphere into a reduced pressure state in a state pressed from the top, heating it while securing a sufficient reduced pressure state to melt a film having a low melting point, and placing a film having a low melting point and a dried and pressed flower in close contact with each other, and a method of manufacturing the same.

A second embodiment according to the present invention is concerned with a product obtained by placing a film having a low melting point on a bed plate, placing a dried and pressed flower thereon, placing a further film having a low melting point, placing an atmosphere into a reduced pressure state in a state pressed from the top, heating it while securing a sufficient reduced pressure state to melt a film having a low melting point, and placing a dried and pressed flower and upper and lower films having a low melting point in close contact with one another, and a method of manufacturing the same.

In any of t-he first and second embodiments, it is necessary to place a release paper on a bed plate, after which a dried and pressed flower or a film having a low melting point is placed on. If a base is placed on a bed plate, a release paper can be omitted. When a film having a low melting point is heated, after which it is cooled to be hardened again, it is adhered to a base to provide at once a product having the base. By doing so, the step of adhering to the base can be omitted.

A film having a low melting point is adhered to a cover film in advance, and the film having a low melting point is directed toward a dried and pressed flower, which are then heated and fused. By doing so, the step of adhering a protective cover to the outside of a film having a low melting point can be omitted. Also in this case, a release paper is not required.

Preferably, an antioxidant and/or a ultraviolet absorbent is coated on or mixed into a film having a low melting point or a cover film.

In addition, most preferably, in a case where a base is used, the side of a film having a low melting point or a cover film directed toward a base and the side opposite thereto are coated with a coating resin, or a coating film is placed, and a film having a low melting point and a dried and pressed flower together with a base or the whole cover film are integrally wrapped.

The embodiments will be described hereinbelow with reference to the drawings.

Figure 2:
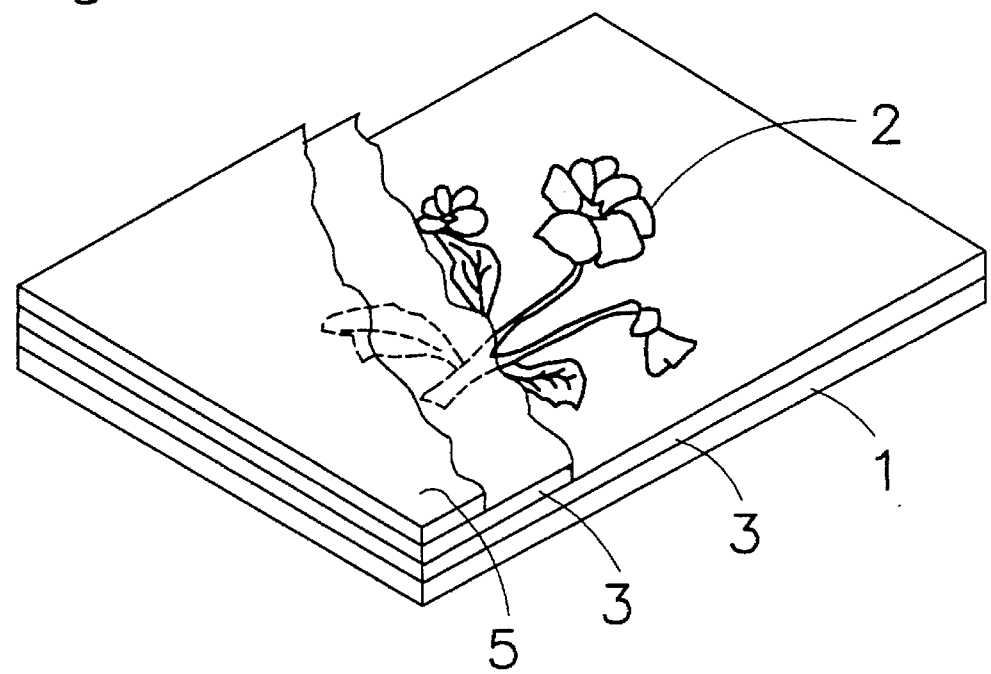
FIG. 2 is an inclined view partly cutaway of an ornament of a dried and pressed flower according to the present invention, which is different in mode from that shown in FIG. 1.
Figure 3:
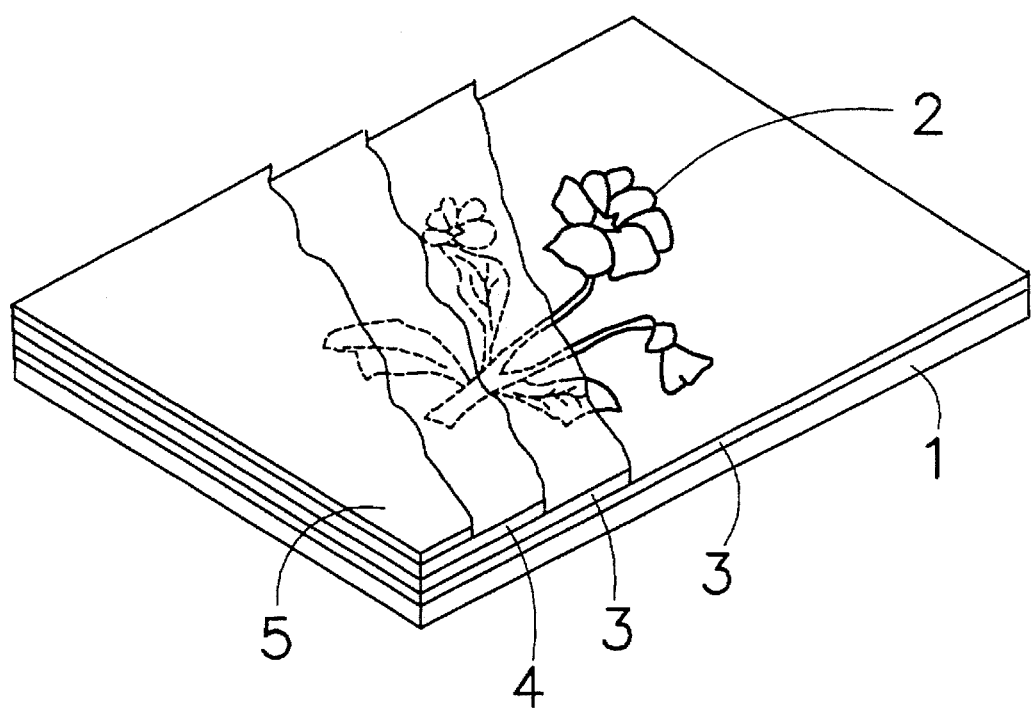
FIG. 3 is an inclined view partly cutaway of an ornament of a dried and pressed flower according to the present invention, which is different in mode from that shown in FIGS. 1 and 2.

FIGS. 1, 2 and 3 show modes of embodiments different from one another. In FIG. 1, one film having a low melting point is used, and in FIG. 2, two films are used. In FIG. 3, a cover film in addition to a film having a low melting point is used.

Reference numeral 1 designate a base; 2 a dried and pressed flower; 3 a film having a low melting point; 4 a cover film; and 5 a coating resin.

In FIGS. 1 and 2, the base 1, the dried and pressed flower 2 and the film having a low melting point 3 are placed one over another and pressed, in which state they are placed on a bed plate. In FIG. 3, a film having a low melting point and a cover film 4 are placed one over the other, which are placed on a bed plate. After being placed on the bed plate, the whole atmosphere including the bed plate is reduced in pressure so that a meter of a vacuum pump displays 0, in which state it is heated by heating means not shown to melt a film having a low melting point. Subsequently, reduction in pressure stops and heating stops. The film having a low melting point is again solidified. Thereafter, the whole including the base is removed from the bed plate.

In this case, pressure applied to urge the film having a low melting point against the base is preferably 1.5 atm. If the pressure is too high, in the state in which the film having a low melting point is molten, the dried and pressed flower is flown out of the film having a low melting point so that sealing of the dried and pressed flower by the film having a low melting point becomes insufficient. On the other hand, if the pressure is too low, the film having a low melting point becomes contracted during the course of solidification and does not return to an original plat-plate state.

Reduction in pressure required is less than about 200 mm of mercury in a column, preferably, the state in which a display of a vacuum pump meter is 0. Substantially, a small chamber including a bed plate is formed, the small chamber is sealed, and air is discharged by a vacuum pump to reduce pressure. It is effective than at a moment a film having a low melting point is molten, pressure is reduced to 0 which is indicated by the pump meter.

An object of reducing pressure is that when a film having a low melting point becomes fused and then permeated into a portion of petals of a dried and pressed flower laid to overlap each other or a portion surrounded by fine hairs of the surface of a leaf, the presence of air or vapor or water is avoided on such portions as described above, and that the molten film is prevented from direct close contact with the portions of a dried and pressed flower to simultaneously take air or vapor or water therein.

If the molten film is cooled taking air or vapor or water therein while carrying them, air or vapor or water produces foams in the film. The foams are not preferable because the beauty of the finished product is impaired.

The presence of the foams causes concealed air or vapor or water to act on a dried and pressed flower to promote fading and discoloring. Even if the flower is sealed with much effort, its meaning is lost. It is therefore necessary to absolutely avoid the presence of foams.

Heating is determined according to the melting point of a film having a low melting point used. A film having a low melting point which is easily available and can be easily handled is generally one at 70° to 120° C.

In a case where a base comprises glass or pottery, it takes time to increase a temperature. Therefore, only a base or a base and a film placed in direct contact therewith is heated in advance. By doing so, it is possible to decrease the time for which a dried and pressed flower is exposed to a high temperature. Even in a case where a dried and pressed flower is exposed to a high temperature, the whole atmosphere is reduced in pressure close to 0 whereby possible discolor of a dried and pressed flower can be minimized.

Reduction in pressure and heating should not be carried out rapidly. Even in a case where a dried and pressed flower is small, several minutes, preferably, about 10 minutes are required so that a display of a vacuum pump may gradually assume 0. Raising the temperature should be done after the atmosphere has reached a reduced pressure state, and excessively early raising is not preferable. Excessively rapid reduction in pressure possibly results in a scratch in the surface of a dried and pressed flower, and excessively early heating possibly results in sealing of air or vapor or water by a film having a low melting point.

A dried and pressed flower should be sufficiently dried before use. However, it is difficult to guarantee that a sufficient drying is always given to a flower. That is, the flower momentarily absorbs water depending on a slight change in circumstances within the room and the way of handling during use to lower dryness. When sealing by a film having a low melting point is carried out under this condition, the product loses its evenness, failing to stand against use. Accordingly, it is very important to use time for reduction in pressure after a dried and pressed flower has been supplied. Thereby, the dried and pressed flower is subjected to finishing of final drying. Although substantial measuring is difficult, it is contemplated that moisture of a dried and pressed flower at the moment a film having a low melting point is molten is so low as to be close to an absolutely dried state. Under this state, a dried and pressed flower is sealed by a film having a low melting point.

In the thus obtained product, the whole dried and pressed flower is placed in close contact with a film having a low melting point, and no foam is present in the film having a low melting point. Accordingly, the dried and pressed flower is completely cut off from external air and moisture and is not changed due to entry of air, water, etc. from outside. It is therefore possible to maintain the color and gloss of the flower for long periods.

Furthermore, since air or vapor or water is not present interiorly, a change from the interior is not produced, and maintenace of color and gloss is further extended. Moreover, since no foam is present interiorly, beauty is not impaired.

In addition, since a film having a low melting point is placed in close contact with a dried and pressed flower, the flower has a fresh-looking gloss despite the fact that the flower is dried, providing a gracefulness which has not heretofore been present.

It is an effective protective method to coat the outermost side of the product with a resin layer.

In FIGS. 1, 2 and 3, a resin is coated on the outside of a film having a low melting point to a base. The resin is adhered to the outside of the film having a low melting point by coating, spraying, etc.

In coating, spraying, etc., a solvent is used or a reaction liquid is used at the same time. Further, the outermost side is coated with a photosensitive resin, after which a predetermined light is irradiated thereon to set it. This process is suitable to make the surface of the finished resin harder, thicker and more glossy.

In FIG. 3, a film having a low melting point 3 is integral with a cover film 4. In this example, the presence of the cover film further strengthens the protection. In this case, the coated resin is expected to protect the interior and in addition, expected to give gloss to the outside to make the whole beautiful.

For the base 1, there can be used those which are hard and whose surface is dense such as wood, glass, metal, pottery and synthethic resin plate; those which are soft and whose surface is rough such as fiber cloth and paper; those which are soft and whose surface is dense such as film and those which are soft and whose surface is rough such as leather, as already described above.

Adhesion with these bases can be performed simultaneously with sealing of a dried and pressed flower which is an important matter of the present invention, and in addition, such simultaneous accomplishment is advantageous. Particularly, in the embodiment in which a film having a low melting point is used only on one side of a dried and pressed flower and sealing is performed, as shown in FIG. 1, those whose surface is dense such as wood, glass, metal, pottery, synthetic resin plate, film, etc. are used for the base, and sealing and mounting are simultaneously carried out, which is particularly advantageous.

In a case where a film having a low melting point is adhered to a base, if the surface of the base is dense and if a portion on which the film is placed is subjected to rough-surface processing in advance before the film is placed, it is very advantageous in adhering the film and the film is extremely firmly adhered to the surface of the base. As methods for rough-surface processing, there can be employed suitable methods such as using sand-paper to roughen portions of the base where necessary, applying sand blast processing, or using a suitable drug to attach the surface.

Examples will be described hereinbelow.

Example 1

A picked wild violet was sandwiched between newspapers, which were stacked and pressed. Then newpapers were replaced twice a day, and this procedure was repeated for a week. The moisture content of the obtained wild violet was 15%.

Next, a pottery plate of 5 mm in thickness, 15 cm in width and 15 cm in length was placed in a small room provided with a vacuum pump, placed thereon a vinyl acetate film having a low melting point (95° C.) of 300μ in thickness, 15 cm in width and 15 cm in length, and further placed thereon a prepared wild violet in a predetermined shape.

A film having the same size, thickness and material as that of the film having a low melting point previously used was placed on the wild violet.

The interior of the small room was gradually reduced in pressure and raised in temperature from normal temperature and normal pressure in 20 minutes to have 100 mmHg 90° C. Thereafter, the temperature was raised while pressing the pottery plate, the film having a low melting point, the wild violet and the film having a low melting point at 1.5 atm. to melt the film having a low melting point, after which heating was stopped and reduction in pressure was stopped. The film having a low melting point was solidified to seal the wild violet and place it in close contact with the pottery plate.

A liquid calendering photosensitive resin was coated in a thickness of 0.6 mm on the solidified film having a low melting point by a brush, and thereafter subjected to levelling in a dust-free state, and ultraviolet rays were irradiated thereon to cure the photosensitive resin.

The thus obtained product maintains a natural color of a violet flower. The flower is not at all damaged, the interior thereof is free from foams, and the exterior thereof is glossy and excellent in transparency.

The obtained product was immersed into water and left on a veranda for one year. The flower was not discolored and faded.

Example 2

Two films having a low melting point were used in Example 1 but one film was Used in this Example. The same article as that of Example 1 was used except that the surface of the pottery plate was roughened with sand paper. This pottery plate was preheated, and thereafter a violet subjected to the same processing as that of the wild violet used in Example 1 was directly placed on the pottery plate. Placed thereon was a film having a low melting point under the same conditions as used in Example 1 except that the thickness thereof was 400μ. Processing was conducted under the same conditions as in Example 1 except the foregoing. The obtained product was the same as in Example 1. The state of the flower, the interior being free from foams, the exterior being glossy, and no fading and discloring of flower for long periods were obtained.

Example 3

A thick post-card was used in place of the pottery plate used in Example 1. Processing was conducted under the conditions similar to Example 1 except that the base was changed.

The obtained product was excellent such that a violet flower was brought into relief on the post-card. This was left on a veranda for six months, but no disclor and fading appeared.

The present invention has excellent results as described above, and the effects thereof may be summerized as follows.

(1) A dried and pressed flower is gradually reduced in pressure and heated in advance with the flower placed over a base and a film having a low melting point, whereby the flower is subjected to finishing of drying before sealing. Accordingly, at a moment a flower is sealed by a film having a low melting point by heating and pressing, inconvenient portions around the flower are completely eliminated, and the flower is in a state close to an absolutely dried state.

This provides an extremely preferable state after sealed, and a flower is completely sealing by a film having a low melting point.

(2) As the result, the product is completely free from the presence of those problems which adversely affect maintenance of color and gloss of a flower for lone periods. Since sealing is completely conducted, the product is free from entry of those adversely affecting thereon from exterior during use. Accordingly, the gracefulness of the product can be secured for lone periods.

(3) Selection of a suitable base, particularly, a base whose surface is dense, a film having a low melting point and a cover film is effective in omission of process, and a finished product can be obtained at once.

(4) Means such as selection of a suitable base, use of a cover film, use of a coating resin, employment of ultraviolet absorbent or antioxidant can be applied to thereby enlarge the characteristics of the products in various ways. Therefore, the range of use of the products can be extremely widened.

Industrial Applicability

According to the present invention, a dried and pressed flower is sealed by a film having a low melting point in a short period of time and completely in a state free from vapor, water or air, and therefore, the dried and pressed flower can maintain its color, gloss and gracefulness for long periods. Accordingly, the products can be widely utilized as various ornaments singly or in a combination with various bases.

I claim:

1. A method for manufacturing a sealed ornament of a dried and pressed flower comprising:

placing said dried and pressed flower on a base;

placing a film having a low melting point over said dried and pressed flower and at least a portion of said base;

placing said base, said dried and pressed flower and said film in a chamber capable of reducing atmospheric pressure and then reducing the atmospheric pressure from ambient in the chamber;

applying heat to melt said film; and applying pressure to said film by increasing atmospheric pressure in said chamber and allowing said film to solidify to thereby seal said dried and pressed flower from said ambient atmosphere.

2. The method for manufacturing a sealed ornament of a dried and pressed flower according to claim 1, wherein a cover film is further placed on said film.

3. The method defined in claim 2 wherein said cover film is a polyester.

4. The method defined in claim 1 wherein melting comprises heating said film at between 70° C. and 120° C.

5. The method defined in claim 1 wherein said base is a material selected from the group consisting of wood, glass, metal, pottery, synthetic resin plate, cloth, paper, and leather.

6. The method defined in claim 1 wherein said base is made from pottery.

7. The method defined in claim 1 wherein the pressure is reduced to less than 200 mm Hg.

8. The method defined in claim 1 wherein the pressure is reduced to about 0 mm Hg.

9. The method defined in claim 1 wherein said film is at least 20µ in thickness.

10. The method defined in claim 1 wherein said film is at least 100µ in thickness.

11. The method defined in claim 1 wherein pressure is applied at about 1.5 atm.

12. The method defined in claim 1 wherein said film is a compound selected from the group consisting of polypropylene, polybutyral, ethylenevinylacetate and polyamide.

13. The method defined in claim 1 wherein said base is glass or pottery and said base is heated prior to placement of said dried and pressed flower.

14. A method for manufacturing a sealed ornament of a dried and pressed flower comprising:

placing a first film having a low melting point on at least a portion of a base;

placing said dried and pressed flower on said first film;

placing a second film having a low melting point on said dried and pressed flower and said first film;

reducing atmospheric pressure from ambient around said films, said dried and pressed flower and said base;

applying heat to melt said films to a molten state;

applying pressure to said melted films by increasing atmospheric pressure in said chamber and allowing said films to solidify to thereby seal said dried and pressed flower from said ambient atmosphere.

15. The method defined in claim 14 wherein a cover film is further placed on said second film.

16. The method for manufacturing a sealed ornament of a dried and pressed flower defined in claim 15 wherein an antioxidant or ultraviolet absorbent resin is placed on said cover film.

17. The method for manufacturing a sealed ornament of a dried and pressed flower defined in claim 15 wherein an antioxidant and ultraviolet absorbent resin is placed on said cover film.

18. The method defined in claim 14 where an antioxidant and/or ultraviolet absorbent is placed on said second film.

19. A method for manufacturing a sealed ornament of a dried and pressed flower comprising:

placing said dried and pressed flower on a base made from a material selected from the group consisting of wood, glass, metal, pottery, synthetic resin plate, cloth, paper, soft film and leather;

placing a film having a low melting point and made from a compound selected from the group consisting of polypropylene, polybutyral, ethylenevinylacetate and polyamide over said dried and pressed flower and at least a portion of said base at a thickness of at least 20μ;

placing said base, said dried and pressed flower and said film in a chamber capable of reducing atmospheric pressure and then reducing the atmospheric pressure in the chamber from ambient to 200 mm Hg or less;

heating said film at between 70° C. and 120° C. to melt said film; and thereafter applying pressure at about 1.5 atm to said melted film and allowing said film to solidify to thereby seal said dried and pressed flower from said ambient atmosphere.

* * * * *